United States Patent
Aya

(10) Patent No.: US 10,734,626 B2
(45) Date of Patent: Aug. 4, 2020

(54) ELECTROCHEMICAL DEVICE

(71) Applicant: NEC ENERGY DEVICES, LTD., Kanagawa (JP)

(72) Inventor: Dai Aya, Kanagawa (JP)

(73) Assignee: Envision AESC Energy Devices Ltd., Sagamihara-shi, Kanagawa (JP)

(*) Notice: Subject to any disclaimer, the term of this patent is extended or adjusted under 35 U.S.C. 154(b) by 141 days.

(21) Appl. No.: 15/754,663

(22) PCT Filed: May 23, 2016

(86) PCT No.: PCT/JP2016/065208
§ 371 (c)(1),
(2) Date: Feb. 23, 2018

(87) PCT Pub. No.: WO2017/033514
PCT Pub. Date: Mar. 2, 2017

(65) Prior Publication Data
US 2018/0254448 A1    Sep. 6, 2018

(30) Foreign Application Priority Data

Aug. 25, 2015 (JP) .................................. 2015-165642

(51) Int. Cl.
 *H01M 2/16* (2006.01)
 *H01G 11/52* (2013.01)
 (Continued)

(52) U.S. Cl.
 CPC ............ *H01M 2/168* (2013.01); *H01G 11/12* (2013.01); *H01G 11/52* (2013.01); *H01G 11/82* (2013.01);
 (Continued)

(58) Field of Classification Search
 CPC ............................................ H01M 2/16–1686
 See application file for complete search history.

(56) References Cited

U.S. PATENT DOCUMENTS

2007/0117008 A1*  5/2007  Kaneko ............ H01M 10/0525
                                                              429/152
2011/0244304 A1* 10/2011  Shinyashiki ............ H01M 2/16
                                                              429/139

FOREIGN PATENT DOCUMENTS

JP    2001-351692 A    12/2001
JP    2006-59717 A     3/2006
(Continued)

OTHER PUBLICATIONS

Google Patents Machine Translation of JP 2001-351692 originally published to Koike dated Dec. 21, 2001.*
(Continued)

*Primary Examiner* — Jonathan G Leong
(74) *Attorney, Agent, or Firm* — Sughrue Mion, PLLC

(57) ABSTRACT

Electrochemical device 1 includes: electric storage element 5 that includes positive electrode 2, negative electrode 3 and a plurality of separators 4, positive electrode 2 and negative electrode 3 overlapping each other with separators 4 interposed therebetween; and outer container 8 that is composed of flexible film 7, outer container 8 containing electric storage element 5. Separators 4 include adhesive separator 4a and heat-resistant separator 4b whose melting point is higher than the melting point of adhesive separator 4a, and at least a part of adhesive separator 4a is welded to flexible film 7 that makes up outer container 8.

7 Claims, 8 Drawing Sheets

(51) Int. Cl.
    *H01M 10/0585* (2010.01)
    *H01G 11/12* (2013.01)
    *H01G 11/82* (2013.01)
    *H01M 2/02* (2006.01)
    *H01M 4/133* (2010.01)
    *H01M 4/134* (2010.01)
    *H01M 4/66* (2006.01)
    *H01M 10/0525* (2010.01)
    *H01G 11/78* (2013.01)
    *H01M 4/02* (2006.01)

(52) U.S. Cl.
    CPC ........... *H01M 2/02* (2013.01); *H01M 2/0275* (2013.01); *H01M 2/1653* (2013.01); *H01M 4/133* (2013.01); *H01M 4/134* (2013.01); *H01M 4/662* (2013.01); *H01M 10/0525* (2013.01); *H01M 10/0585* (2013.01); *H01G 11/78* (2013.01); *H01M 2004/027* (2013.01); *H01M 2004/028* (2013.01)

(56) References Cited

FOREIGN PATENT DOCUMENTS

| | | |
|---|---|---|
| JP | 2006-147349 A | 6/2006 |
| JP | 2010-277925 A | 12/2010 |
| JP | 2011-175749 A | 9/2011 |
| JP | 2011-210524 A | 10/2011 |
| JP | 2012-174590 A | 9/2012 |
| JP | 2013-41786 A | 2/2013 |
| JP | 2013-73913 A | 4/2013 |
| JP | 2013-84410 A | 5/2013 |
| JP | 2013-254629 A | 12/2013 |
| JP | 2014-137985 A | 7/2014 |

OTHER PUBLICATIONS

Google Patents Machine Translation of JP 2011-175749 originally published to Ueki et al. dated Sep. 8, 2011.*
EPO Machine Translation of JP 2014137985 originally published to Fukumoto et al. dated Jul. 28, 2014 (Year: 2014).*
International Search Report for PCT/JP2016/065208, dated Aug. 16, 2016.

* cited by examiner

ELECTROCHEMICAL DEVICE

CROSS REFERENCE TO RELATED APPLICATIONS

This application is a National Stage of International Application No. PCT/JP2016/065208 filed May 23, 2016, claiming priority based on Japanese Patent Application No. 2015-165642, filed Aug. 25, 2015.

TECHNICAL FIELD

The present invention relates to an electrochemical device.

BACKGROUND ART

Secondary batteries, which are exemplary electrochemical devices, have widely proliferated not only as power sources of portable devices such as mobile phones, digital cameras and laptop computers but also as vehicle or household power sources. In particular, a lightweight lithium ion secondary battery with a high energy density is an energy accumulation device that is indispensable for daily life. Among the secondary batteries, a laminated type secondary battery is configured having an electric storage element in which a plurality of positive and negative electrode sheets are alternately laminated multiple times with separators interposed therebetween and the electric storage element is contained in an outer container with an electrolyte.

In such a secondary battery, a shock, a vibration or the like that is received from a source that is outside of the outer container can produce a positional shift of the electric storage element in the interior of the outer container, and thereby, can cause a decrease in reliability of electric connection, a decrease in energy density, or can damage the flexible film as a result of an edge portion of the electric storage element coming into contact with the inner surface of the flexible film.

Hence, Patent Document 1 discloses a battery configured such that a part of the separator protrudes laterally from the positive electrode and the negative electrode, a through-hole is provided on the protrusion portion, and an upper flexible film and a lower flexible film that make up the outer container come into direct contact with each other and are welded in the through-hole. Patent Document 2 discloses a battery configured such that a part of the separator protrudes laterally from the positive electrode and the negative electrode, and the protrusion portion comes into contact with and is welded to upper and lower flexible films.

In recent years, the increase in the capacity of the battery and the increase in the energy density of the battery have increased the risk of significant heat generation, and therefore, enhancement of heat resistance has been desired. In particular, if the separator that is positioned between the positive electrode and the negative electrode is thermally fused, or if the separator that is positioned between the outermost electrode (typically, the negative electrode) and the flexible film that makes up the outer container is thermally fused, thermal fusion can produce an electric short circuit and can cause an additional and greater increase in heat generation, and therefore, heat resistance properties are desired. For example, Patent Document 3 discloses a separator composed of a fiber assembly whose melting point is 150° C. or higher, and Patent Document 4 discloses a separator composed of a porous membrane whose glass transition temperature is 70° C. or higher.

PRIOR ART DOCUMENT

Patent Document

Patent Document 1: JP2013-84410A
Patent Document 2: JP2012-174590A
Patent Document 3: JP2006-59717A
Patent Document 4: JP2006-147349A

SUMMARY OF INVENTION

Problem to be Solved by the Invention

In the configuration described in Patent Document 1, there can be some play between the through-hole of the separator and the welding portion of the flexible film, and therefore, it is not easy to completely prevent the positional shift of the electric storage element. When the number of the layers configuring the electric storage element is large, the number of the layers of the separators is also large, and the total thickness is large. Therefore, it is not easy to provide through-holes on protrusion portions of many separators, at precisely the same position, and to have the flexible films make direct contact with each other within the through-holes, and it thus becomes troublesome effort to thermally weld the flexible films to each other. The process can be facilitated by making only a single separator or a few separators protrude from the electric storage element, providing through-holes, and thermally welding flexible films to each other within the through-holes. However, for most of the layers configuring the electric storage element, movement is not directly restricted, and therefore, the reliability of preventing a positional shift of the electric storage element is low.

In the configuration described in Patent Document 2, a through-hole is unnecessary, and the manufacturing task is easy compared to Patent Document 1. Furthermore, in the configuration described in Patent Document 2, the inner surface of the flexible film that makes up the outer container is composed of nylon, polyimide or the like, and the separator is composed of a material with a melting point equivalent to or lower than the melting point of the inner surface of the flexible film, as exemplified by polypropylene or polyethylene. Therefore, the separator and the flexible film are accordingly bonded by thermal welding. However, only a part of the separator protrudes and bonds to the flexible film. Therefore, for most of the layers configuring the electric storage element, movement is not directly restricted, and the reliability of preventing a positional shift of the electric storage element is low. Furthermore, since the melting point of the separator is low, the problem arises in which the separator will melt as a result of heat generated by batteries having high capacity and high energy density and therefore a separator, whose main function is to prevent a short circuit, fails to meet its purpose. If a high-melting-point separator shown in Patent Documents 3, 4 is employed in the configuration in Patent Document 2, the thinking is that the strength of the bonding between the high-melting-point separator and the flexible film that makes up the outer container is insufficient and thus the effect of preventing movement of the electric storage element is low.

An object of the present invention is to provide an electrochemical device that makes it possible to ensure heat resistance and to ensure that, by using an easy manufacturing process, positional shifting of the electric storage element can be prevented or reduced.

Means to Solve the Problem

An electrochemical device in the present invention includes: an electric storage element that includes a positive electrode, a negative electrode and a plurality of separators, the positive electrode and the negative electrode overlapping each other with the separators interposed therebetween; and an outer container that is composed of a flexible film, the outer container containing the electric storage element. The separators include an adhesive separator and a heat-resistant separator whose melting point is higher than the melting point of the adhesive separator, and at least a part of the adhesive separator is welded to the flexible film that makes up the outer container.

Advantageous Effects of Invention

According to the present invention, in an electrochemical device, it is possible to ensure heat resistance and to ensure that, by using an easy manufacturing process, positional shifting of the electric storage element can be prevented or reduced.

DESCRIPTION OF EXEMPLARY EMBODIMENTS

Hereinafter, exemplary embodiments will be described with use of the drawings.

Figure 1A:
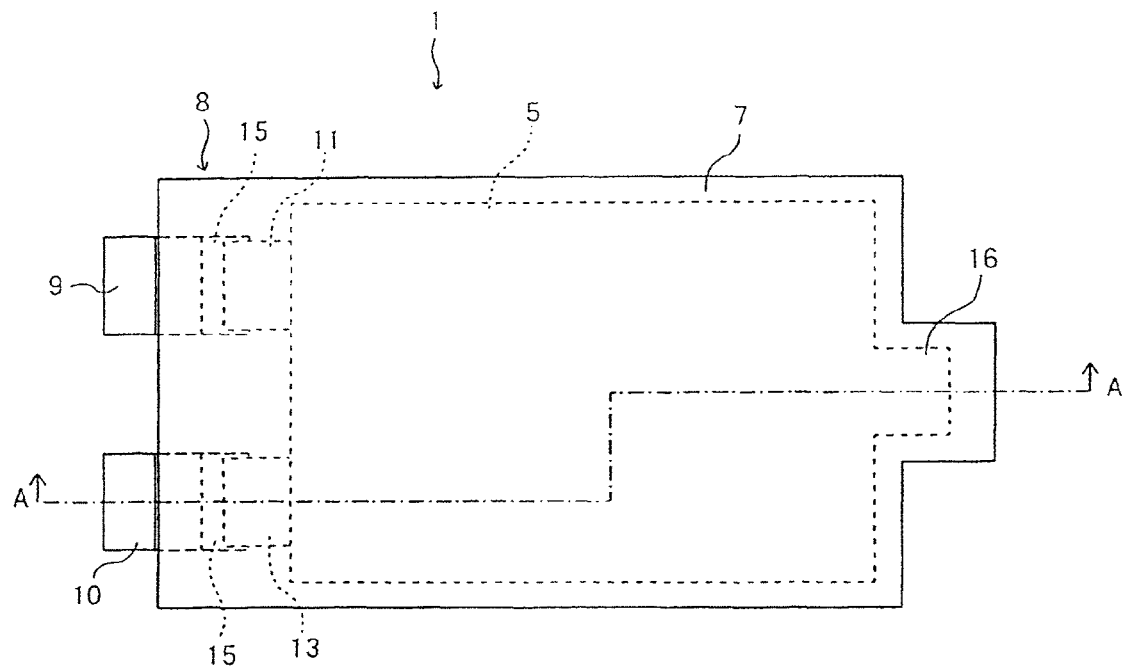
FIG. 1A is a plan view showing the basic structure of a first exemplary embodiment of a laminated type secondary battery that is an exemplary electrochemical device of the present invention.
Figure 1B:
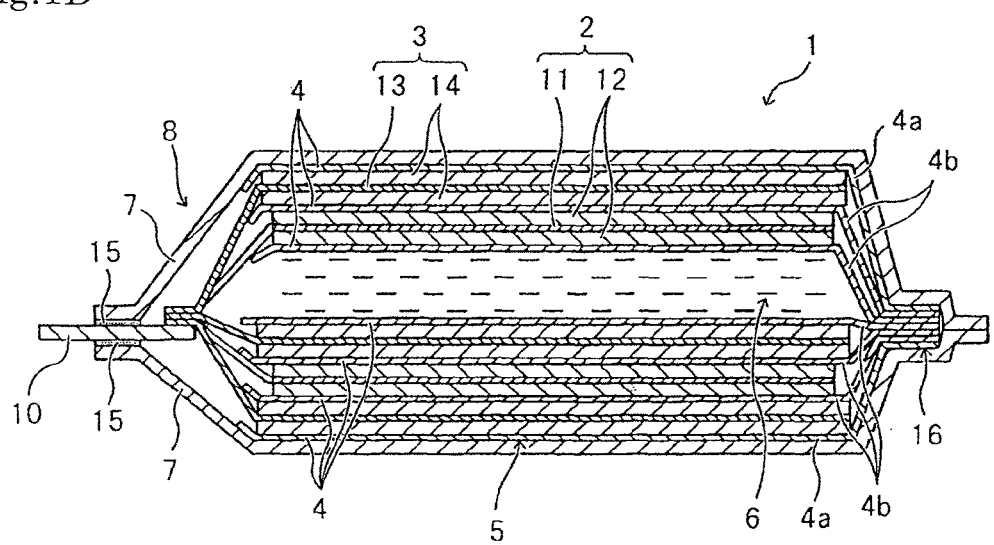
FIG. 1B is a cross-section view taken along line A-A in FIG. 1A.

FIGS. 1A and 1B schematically show the configuration of laminated type lithium ion secondary battery 1 that is an exemplary electrochemical device in a first exemplary embodiment of the present invention. FIG. 1A is a plan view as viewed from the upper side perpendicular to a principal surface (flat surface) of secondary battery 1, and FIG. 1B is a cross-section view taken along line A-A in FIG. 1A.

Lithium ion secondary battery 1 of the present invention includes electric storage element (battery element) 5 in which positive electrodes (positive electrode sheets) 2 and negative electrodes (negative electrode sheets) 3 are alternately stacked on each other with separators 4 interposed therebetween. Electric storage element 5 is contained with electrolyte 6 in outer container 8 composed of flexible film 7. Positive electrode 2 of electric storage element 5 is connected with one end of positive electrode terminal 9, and negative electrode 3 is connected with one end of negative electrode terminal 10. Each of the other end of positive electrode terminal 9 and the other end of negative electrode terminal 10 extends from outer container 8. In FIG. 1B, some of the layers configuring electric storage element 5 (layers positioned at an intermediate portion in the thickness direction) are omitted, and electrolyte 6 is illustrated. As a result, it is assumed that current collectors of electrodes (positive electrodes 2 and negative electrodes 3) omitted at a central portion of electric storage element 5 are not present even at a portion where the current collectors (tabs) of the electrodes overlap on electrode terminals (positive electrode terminal 9 and negative electrode terminal 10). Similarly, it is assumed that a plurality of separators 4 omitted at the central portion of electric storage element 5 are not present even at a portion where separators 4 overlap on each other and are sandwiched between flexible films 7.

Positive electrode 2 includes current collector (positive electrode current collector) 11 for the positive electrode, and active material layer (positive electrode active material layer) 12 for the positive electrode that is applied on positive electrode current collector 11. On each of the front surface and back surface of positive electrode current collector 11, an application portion where positive electrode active material layer 12 is formed and a non-application portion where positive electrode active material layer 12 is not formed are positioned so as to be arrayed along the longitudinal direction. Negative electrode 3 includes current collector (negative electrode current collector) 13 for the negative electrode, and active material layer (negative electrode active material layer) 14 for the negative electrode that is applied on negative electrode current collector 13. On each of the front surface and back surface of negative electrode current collector 13, an application portion and a non-application portion are positioned so as to be arrayed along the longitudinal direction.

Each non-application portion (current collector) of positive electrode 2 and negative electrode 3 is used as a tab for the connection with the electrode terminal (positive electrode terminal 9 or negative electrode terminal 10). Positive electrode tabs (non-application portions) of positive electrodes 2 are collected on positive electrode terminal 9, and are connected with each other by ultrasonic welding or the like. Negative electrode tabs (non-application portions) of negative electrodes 3 are collected on negative electrode terminal 10, and are connected with each other by ultrasonic welding or the like. Each of the other end portion of positive electrode terminal 9 and the other end portion of negative electrode terminal 10 is led out of outer container 8 composed of flexible film 7. The external dimensions of the application portion (negative electrode active material layer 14) of negative electrode 3 are larger than the external dimensions of the application portion (positive electrode active material layer 12) of positive electrode 2, and are smaller than or equal to the external dimensions of separator 4.

Flexible film 7 that is positioned on upper side and flexible film 7 that is positioned on lower side cover electric storage element 5, and in this state, outer periphery edge portions overlap and are welded to each other, so that the outer container whose outer periphery portion is sealed is completed. Here, portions of the outer container, where positive electrode terminal 9 and negative electrode terminal 10 are positioned, are sealed by fixing flexible films 7 to heat-adhesive resin layers 15 that have been previously provided on both surfaces of positive electrode terminal 8 and negative electrode terminal 10.

In electric storage element 5, separators 4 are disposed between positive electrodes 2 and negative electrodes 3, and are disposed between the electrodes (in the exemplary embodiment, negative electrodes 3) on the outermost sides and flexible films 7 that make up outer container 8. Parts of separators 4 protrude from a position where positive electrode active material layer 12 and negative electrode active material layer 14 overlap each other. The protrusion portions of separators 4 overlap each other without the interposition of the electrodes (positive electrodes 2 and negative electrodes 3), and in this state, are welded to each other while being sandwiched between flexible films 6. Welding portion 16 of separator 4 and flexible film 7, in the plan view, is positioned on the inside of the portion where the outer periphery portions of flexible film 7 are welded to each other as described above.

Figure 2:
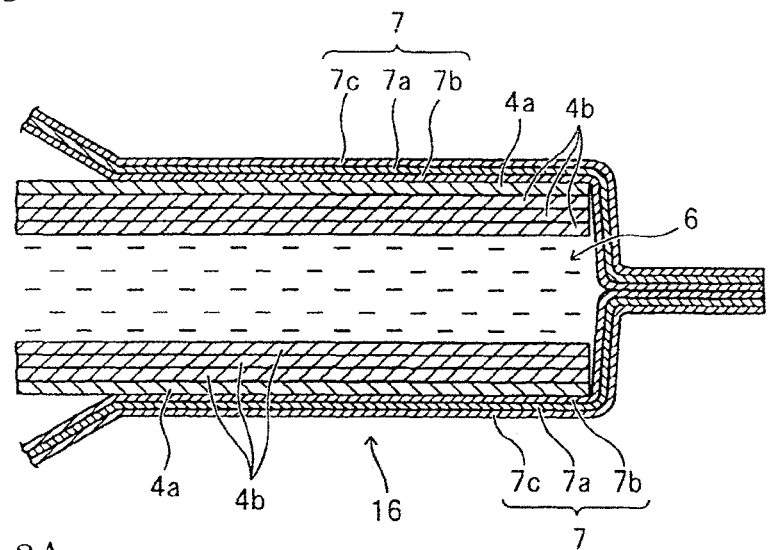
FIG. 2 is an enlarged cross-section view showing a principal part of the secondary battery shown in FIGS. 1A and 1B.

Here, flexible film 7, separator 4 and welding portion 16 where flexible film 7 and separator 4 are to be welded in the exemplary embodiment will be described in detail. As shown in FIG. 2, flexible film 7 is a laminate film in which inner resin layer 7b and outer resin layer 7c are provided on both surfaces of metal layer 7a which is a base. Metal layer 7a is composed of aluminum, stainless steel or the like with a barrier property for preventing the leakage of electrolyte 6 and the intrusion of moisture from the outside, for example. Inner resin layer 7b is composed of a heat-adhesive resin such as modified polyolefin. As described above, sealed outer container 8 can be formed by thermally welding inner resin layers 7b to each other. Outer resin layer 7c is composed of a nylon film, a polyethylene terephthalate film, a polyester film or the like.

Separators 4 in the exemplary embodiment include adhesive separator 4a with a melting point equivalent to the melting point of inner resin layer 7b of flexible film 7, and heat-resistant separator 4b whose melting point is higher than the melting point of adhesive separator 4a. Heat-resistant separator 4b is disposed between positive electrode 2 and negative electrode 3, and adhesive separator 4a is disposed between the electrode (in the exemplary embodiment, negative electrode 3) on the outermost side and flexible film 7. Separator 4 is mainly composed of a porous membrane, a woven fabric, an unwoven fabric or the like that is made of a resin.

Examples of the material of adhesive separator 4a include a polyolefin resin such as polypropylene or polyethylene that has a melting point equivalent to the melting point of flexible film 7 that makes up outer container 8. It is preferable that the difference in melting point between adhesive separator 4a and flexible film 7 be within 20° C. For example, the melting point of adhesive separator 4a is 130° C. as a nominal temperature, the melting point of the flexible film is 140° C. as a nominal temperature, and the difference in the melting points is 10° C. Here, taking into account the temperature width of the melting points, the difference in the nominal melting points is adjusted so as to be within about 20° C.

On the other hand, it is preferable that the material of heat-resistant separator 4b be a resin whose melting point is higher than the melting points of adhesive separator 4a and flexible film 7, preferably a melting point of 300° C. or higher, and a porous resin with a porosity of 55% or higher. Examples thereof include an aramid resin (aromatic polyamide resin). In FIG. 2 and FIGS. 5 and 8 to 16 described later, some of the plurality of separators 4 (separators 4 positioned at an intermediate portion in the thickness direction) are omitted, and electrolyte 6 is illustrated.

Figure 3A:
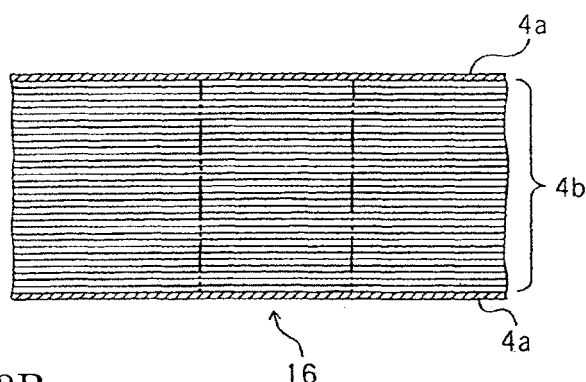
FIG. 3A is an explanatory diagram schematically showing a resin penetration condition of an adhesive separator of the secondary battery shown in FIGS. 1A, 1B and 2.

Because of such a configuration, at the portion where the plurality of separators 4 overlap each other, adhesive separators 4a are positioned as the outermost layers. Adhesive separator 4a has a melting point equivalent to the melting point of the inner resin layer 7b of flexible film 7, and therefore, the two are thermally welded easily and tightly by heating. On the other hand, heat-resistant separators 4b that overlap each other are not melted and are not thermally welded to each other, at the heating temperature at which inner resin layer 7b of flexible film 7 is thermal welded to adhesive separator 4a. However, when adhesive separator 4b with a low melting point is heated and melted, the melted resin material of adhesive separator 4a penetrates the interior of porous heat-resistant separator 4b (for example, a porosity of about 65%). FIGS. 3A to 4B schematically indicate areas where the material that makes up adhesive separator 4a melts and penetrates, by two-dot chain lines. The area indicated by the two-dot chain lines is actual welding portion 16. To facilitate understanding, in FIGS. 3A to 4B, adhesive separators 4a are shown with hatching, and heat-resistant separators 4b are shown with no hatching. As schematically shown in FIGS. 3A and 4A, resin as the material of adhesive separators 4a is positioned on the outermost layers melts, and then penetrates heat-resistant separator 4b. The thus penetrating resin fixes the plurality of heat-resistant separators 4b and the plurality of adhesive separators 4a. Accordingly, flexible films 7 that make up outer container 8, adhesive separators 4a, heat-resistant separator 4b are fixed to each other, and as a result, electric storage element 5 is secured in outer container 8 such that the position is not shifted. By improving the welding property in this way, the reliability of the battery is enhanced, and the productive efficiency of the battery is improved. The most preferable area where the melted resin that makes up the material of adhesive separators 4a, penetrates heat-resistant separators 4b, is in a prismatic or cylindrical shape in which the cross-section area (cross-section shape and cross-section dimensions) is uniform from the lowermost layer to the uppermost layer, as shown in FIG. 3A. Here, there is a possibility that the penetration amount of the resin is larger at a position closer to adhesive separator 4a and that the penetration amount of the resin is smaller at a position more distant from adhesive separator 4a as shown in FIG. 4A. Even in that case, if the resin that makes up the material of adhesive separator 4a penetrates heat-resistant separator 4b as a layer most distant from adhesive separator 4a, electric storage element 5 is secured in outer container 8 such that the position is not shifted.

Figure 3B:
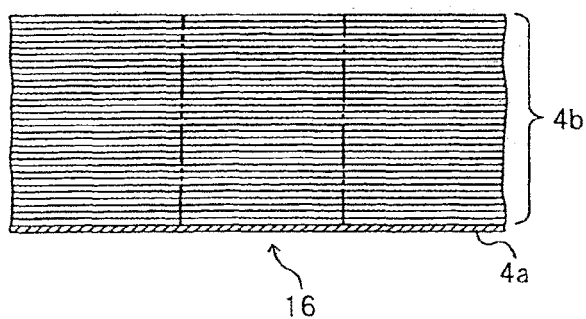
FIG. 3B is an explanatory diagram schematically showing a resin penetration condition of an adhesive separator of an alternative secondary battery.
Figure 4A:
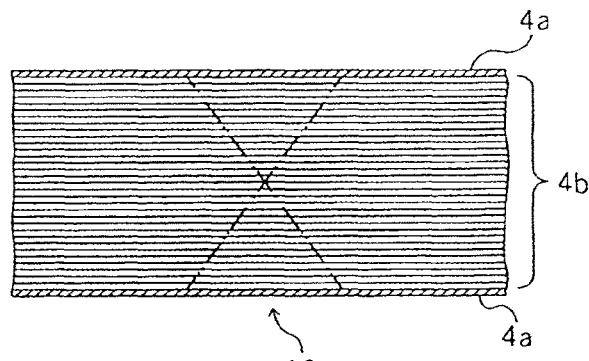
FIG. 4A is an explanatory diagram schematically showing an alternative exemplary resin penetration condition of the adhesive separator of the secondary battery shown in FIGS. 1A, 1B and 2.
Figure 4B:
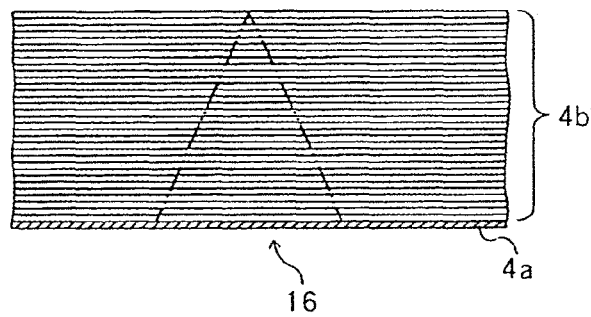
FIG. 4B is an explanatory diagram schematically showing an alternative exemplary resin penetration condition of the adhesive separator of the alternative secondary battery.

In the case where only the lowermost layer of many separators 4 is adhesive separator 4a and the other separators are heat-resistant separators 4b, the most preferable area where the melted resin, that makes up the material of adhesive separators 4a, penetrates heat-resistant separators 4b, is in a prismatic or cylindrical shape in which the cross-section area (cross-section shape and cross-section dimensions) is uniform from the lowermost layer to the uppermost layer, as shown in FIG. 3B. In the case where the penetration amount of the resin is smaller at a position more distant from adhesive separator 4a as shown in FIG. 4B, in order to cause the resin which makes up the material of adhesive separator 4a penetrate heat-resistant separator 4b as the uppermost layer, it is necessary to increase the amount of the resin that penetrates from adhesive separator 4a as the lowermost layer to upper layers, as schematically shown by the two-dot chain lines in FIG. 4B. That is, it is necessary to widen the area of heating adhesive separator 4a as the lowermost layer for melting the resin (corresponding to the area surrounded by the two-dot chain lines), compared to the configuration shown in FIG. 4A.

Next, the detailed configuration of secondary battery 1 shown in FIGS. 1A to 2 will be described. Examples of the active material that makes up positive electrode active material layer 12 of secondary battery 1 include layered oxide materials such as $LiCoO_2$, $LiNiO_2$, $LiMn_2O_2$, $Li_2MO_3$-$LiMO_2$ and $LiNi_{1/3}Co_{1/3}Mn_{1/3}O_2$, spinel materials such as $LiMn_2O_4$, olivine materials such as $LiMPO_4$, olivine fluoride materials such as $Li_2MPO_4F$ and $Li_2MSiO_4F$, and vanadium oxide materials such as $V_2O_5$. In each positive electrode active material, other elements may be substituted for some of the elements that make up these active materials, and an excess amount of Li may be included. One kind of these active materials or mixtures of two or more kinds of them can be used.

Examples of the active material that makes up negative electrode active material layer 14 include carbon materials such as graphite, amorphous carbon, diamond-like carbon, fulleren, carbon nanotubes and carbon nanohorns, lithium metal materials, alloy materials of silicon, tin or the like, and oxide materials such as $Nb_2O_5$ and $TiO_2$, or mixture of them can be used.

Active material mixture agents that make up positive electrode active material layer 12 and negative electrode active material layer 14 are mixture agents in which a binding agent, a conductive auxiliary agent or the like are added to the above-described active materials when appropriate. As the conductive auxiliary agent, one kind of carbon black, carbon fiber, graphite and the like can be used, and combinations of two or more kinds of them can be used. As the binding agent, polyvinylidene fluoride, polytetrafluoroethylene, carboxymethyl cellulose, modified acrylonitrile rubber particles or the like can be used.

Aluminum, stainless steel, nickel, titanium can be used, and alloys of them or the like can be used as positive electrode current collector 11. In particularly, aluminum is preferable. Copper, stainless steel, nickel or titanium can be used, and alloys of them can be used as negative electrode current collector 13.

As electrolyte 6, one kind of organic solvents including cyclic carbonates such as ethylene carbonate, propylene carbonate, vinylene carbonate and butylene carbonate, chain carbonates such as ethyl methyl carbonate (EMC), diethyl carbonate (DEC), dimethyl carbonate (DMC) and dipropyl carbonate (DPC), aliphatic carboxylate esters, γ-lactones such as γ-butyrolactone, chain ethers, and cyclic ethers can be used, and mixtures of two or more kinds of them can be used. Furthermore, in the organic solvents, lithium salt may be dissolved.

Examples of the material of positive electrode terminal 9 include aluminum, and aluminum alloys, and examples of the material of negative electrode terminal 10 include copper, copper alloys and materials resulting from plating nickel on them.

Figure 5:
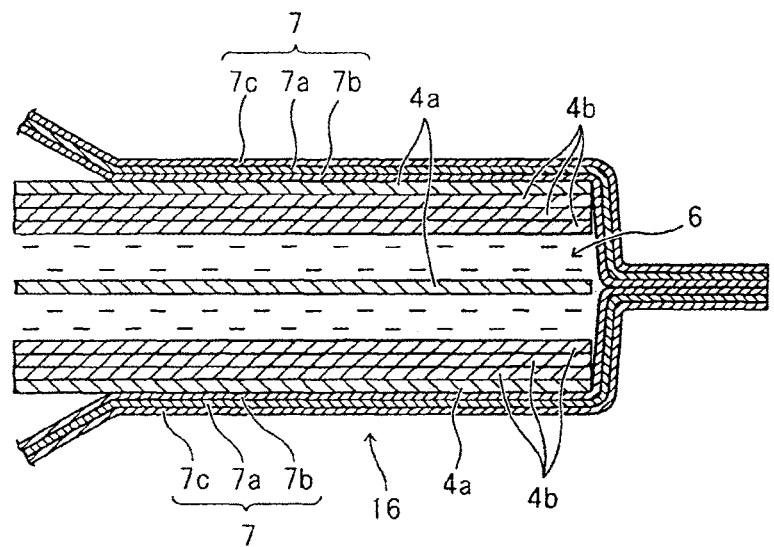
FIG. 5 is an enlarged cross-section view showing a principal part of a secondary battery in a modification of the first exemplary embodiment of the present invention.
Figure 6:
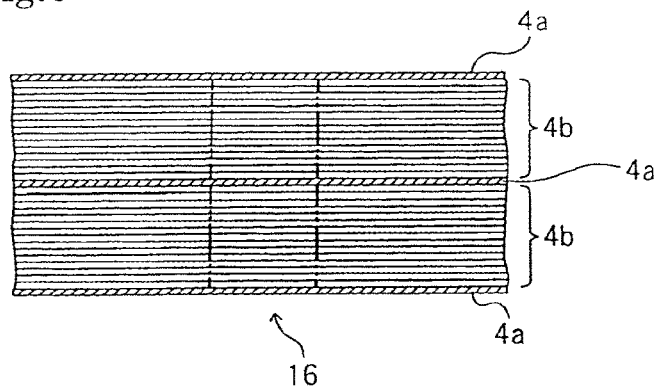
FIG. 6 is an explanatory diagram schematically showing a resin penetration condition of an adhesive separator of the secondary battery shown in FIG. 5.
Figure 7:
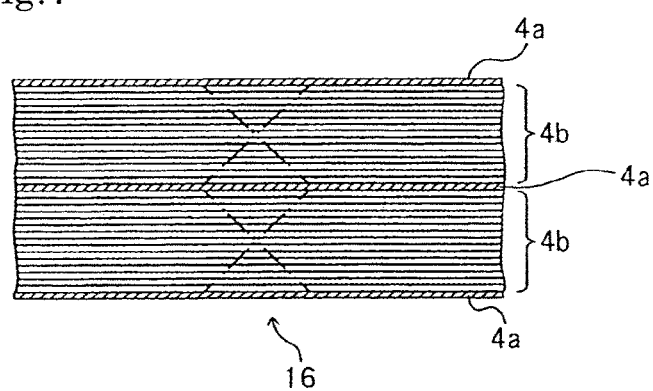
FIG. 7 is an explanatory diagram schematically showing an alternative exemplary resin penetration condition of the adhesive separator of the secondary battery shown in FIG. 5.

FIG. 5 shows a modification of the exemplary embodiment. In the modification, in addition to the outermost layers, one intermediate layer from among many separators is adhesive separator 4a, and the other layers are heat-resistant separators 4b. In FIG. 5, heat-resistant separators 4b positioned at an intermediate portion are omitted, and only adhesive separator 4a is illustrated. According to the configuration, as schematically shown in FIGS. 6 and 7, by heating, in addition to two adhesive separators 4a as the outermost layers, intermediate adhesive separator 4a melts, and penetrates heat-resistant separators 4b positioned on upper and lower sides, and thereby, it is possible to tightly fix them to each other. Since the number of the layers of adhesive separators 4a is increased, the number of the layers of heat-resistant separators 4b to be penetrated by the resin that makes up the material of each adhesive separator is decreased. Therefore, it is possible to reduce the area of welding portion 16, that is, the heating area of adhesive separator 4a (corresponding to the area surrounded by the two-dot chain lines). As a result, it is possible to reduce the part of secondary battery 1 that does not contribute to the original function of the battery, so that the space utilization is enhanced. Adhesive separator 4a just needs to be provided on welding portion 16 for bonding heat-resistant separator 4b to flexible film 7, and does not need to be provided at a position sandwiched between positive electrode 2 and negative electrode 3. Heat-resistant separator 4b is interposed at the position sandwiched between positive electrode 2 and negative electrode 3, and a short circuit is prevented. In the configuration also, the most preferable area where the melted resin, that makes up the material of adhesive separators 4a, penetrates heat-resistant separators 4b, is in a prismatic or cylindrical shape in which the cross-section area (cross-section shape and cross-section dimensions) is uniform from the lowermost layer to the uppermost layer, as shown in FIG. 6. Even when the penetration amount of the resin is smaller at a position more distant from adhesive separator 4a as shown in FIG. 7, electric storage element 5 is secured in outer container 8 such that the position is not shifted, if the resin that makes up the material of adhesive separator 4a penetrates heat-resistant separator 4b as the layer most distant from adhesive separator 4a.

Figure 8:
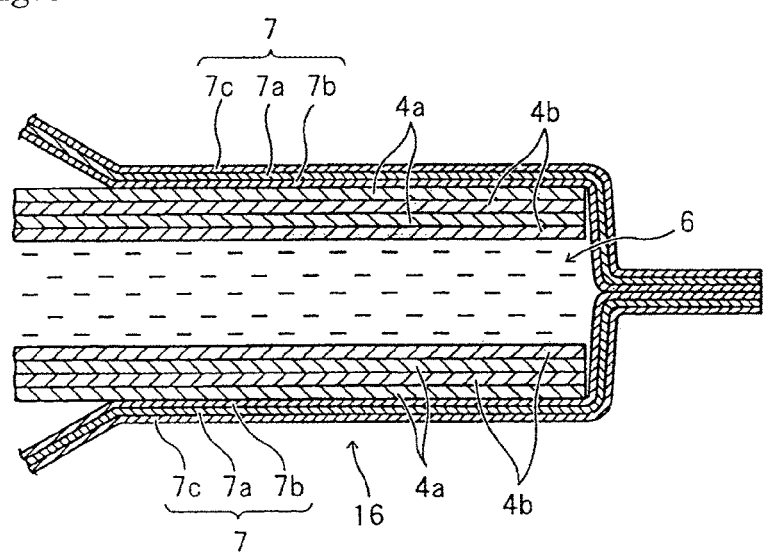
FIG. 8 is an enlarged cross-section view showing a principal part of a secondary battery in an alternative modification of the first exemplary embodiment of the present invention.

FIG. 8 shows an alternative modification of the exemplary embodiment. In the modification, adhesive separators 4a and heat-resistant separators 4b are alternately disposed over the entire electric storage element 5. According to the configuration, the resin that makes up the material of each adhesive separator just needs to penetrate only adjacent heat-resistant separators 4b, and therefore, it is possible to further reduce the area of welding portion 16 and to further enhance space utilization.

Figure 9:
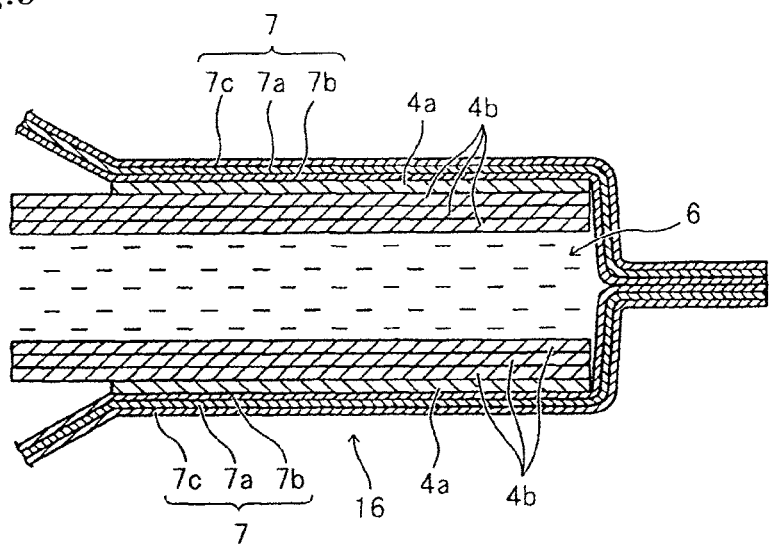
FIG. 9 is an enlarged cross-section view showing a principal part of a secondary battery in a second exemplary embodiment of the present invention.

FIG. 9 shows a second exemplary embodiment of the present invention. In the exemplary embodiment, adhesive separators 4a positioned at the outermost layers of electric storage element 5 are present at only the portions where adhesive separators 4a are thermally welded to flexible films 7 of outer container 8, and are not present at the other portion, that is, the portion positioned at the central portion of the electric storage element in the plan view. According to the configuration, adhesive separators 4a as the outermost layers are thermally welded to flexible films 7, and penetrate heat-resistant separators 4b, and thereby, it is possible to realize, by the minimum necessary size, the effect of bonding adhesive separator 4a, heat-resistant separator 4b and flexible film 7 to each other and separating negative electrode 2 from flexible film 7. Thereby, it is possible to increase the amount of electrolyte 6 to be contained, thereby contributing to increased battery life. The other constituents are the same as those in the first exemplary embodiment, and therefore, the description and the illustration are omitted.

Figure 10:
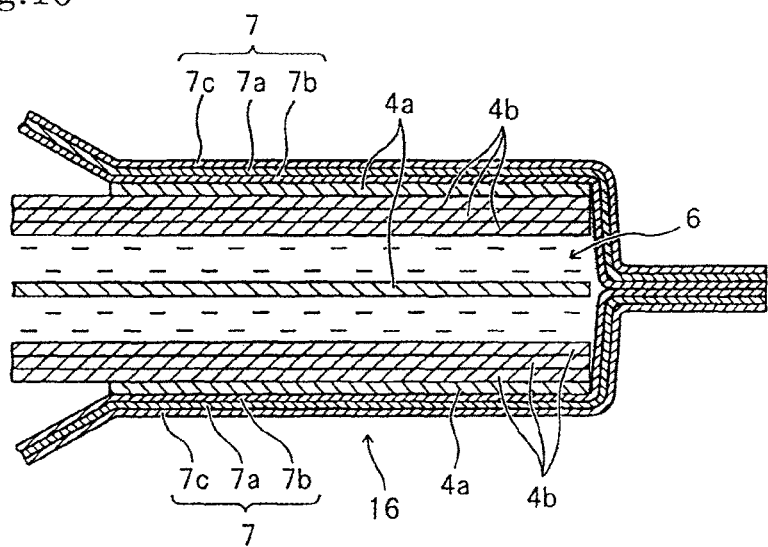
FIG. 10 is an enlarged cross-section view showing a principal part of a secondary battery in a modification of the second exemplary embodiment of the present invention.

FIG. 10 shows a modification of the exemplary embodiment. In the modification, similar to the configuration shown in FIG. 5, in addition to the outermost layers, one intermediate layer from among many separators, is adhesive separator 4a, and the other layers are heat-resistant separators 4b. In FIG. 10, heat-resistant separators 4b positioned at an intermediate portion are omitted, and only adhesive separator 4a is illustrated. According to the configuration, it is possible to reduce the area of welding portion 16 that is necessary for a tight bond, so that space utilization is enhanced.

Figure 11:
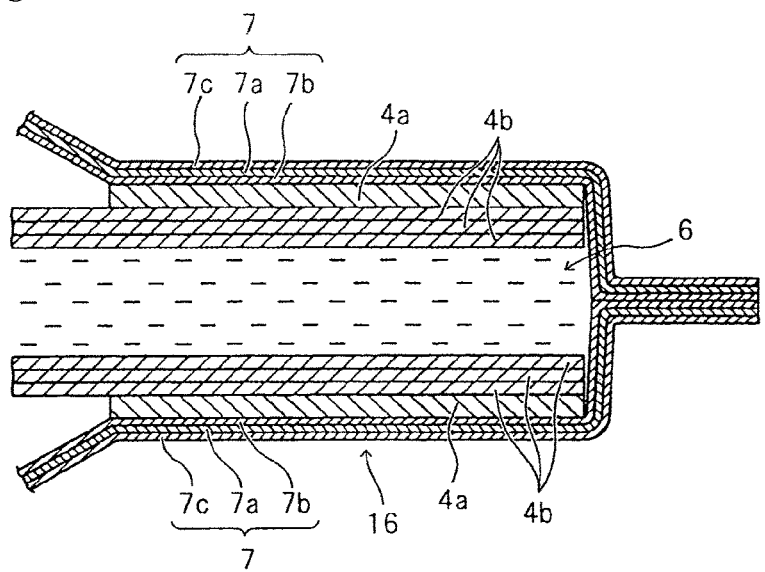
FIG. 11 is an enlarged cross-section view showing a principal part of a secondary battery in an alternative modification of the second exemplary embodiment of the present invention.

FIG. 11 shows an alternative modification of the exemplary embodiment. In the modification, the thickness of adhesive separator 4a positioned at each outermost layer of the electric storage element is increased. In the configuration, since the material of adhesive separators 4a melts and penetrates heat-resistant separators 4b as schematically shown in FIGS. 3A to 4B, the amount of adhesive separators 4a is increased such that a sufficient amount of melted material penetrates heat-resistant separators 4b. Accordingly, it is possible to increase the bond strength, and it is possible to reduce the area of welding portion 16 and enhance space utilization.

Figure 12:
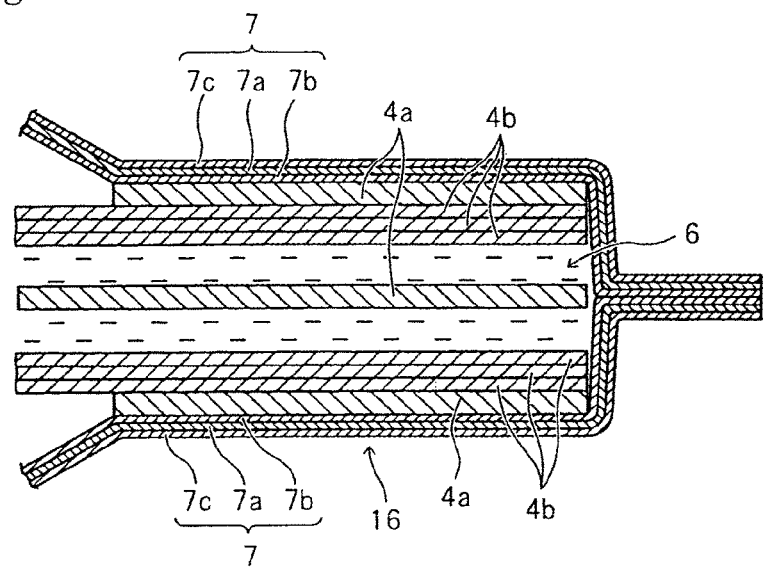
FIG. 12 is an enlarged cross-section view showing a principal part of a secondary battery in a further alternative modification of the second exemplary embodiment of the present invention.

FIG. 12 shows a further alternative modification of the exemplary embodiment. In the modification, similar to the example shown in FIG. 11, the thickness of adhesive separator 4a is increased, and furthermore, similar to the configurations shown in FIGS. 5 and 10, in addition to the outermost layers, one intermediate layer from among many separators is adhesive separator 4a, and the other layers are heat-resistant separators 4b. In FIG. 12, heat-resistant separators 4b positioned at an intermediate portion are omitted, and only adhesive separator 4a is illustrated. According to the configuration, it is possible to further reduce the area of welding portion 16, and enhance space utilization.

Figure 13:
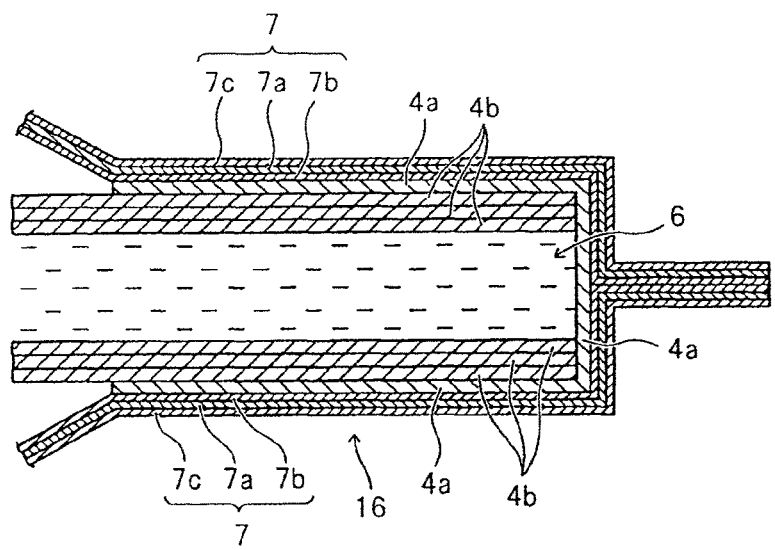
FIG. 13 is an enlarged cross-section view showing a principal part of a secondary battery in a third exemplary embodiment of the present invention.

FIG. 13 shows a third exemplary embodiment of the present invention. In the exemplary embodiment, similar to the second exemplary embodiment, adhesive separator 4a positioned at the outermost layers of electric storage element 5 is present at only the portions where adhesive separator 4a is thermally welded to flexible films 7 of outer container 8, and is not present at the other portion, that is, the portion positioned at the central portion of the electric storage element in the plan view. Furthermore, in the exemplary embodiment, adhesive separator 4a extends so as to cover a lateral side of welding portion 16, that is, edge faces of the laminated separators other than the outermost layers. In the example shown in FIG. 13, one adhesive separator 4a extends from the uppermost layer of electric storage element 5 through the lateral side of welding portion 16 to the lowermost layer. However, a plurality of adhesive separators 4a may be combined, and may be disposed at the uppermost layer and the lowermost layer of electric storage element 5 and the lateral side of welding portion 16. According to the configuration, in addition to the effect of the second exemplary embodiment, when the material that makes up adhesive separator 4a melts and penetrates heat-resistant separators 4b, the material can simultaneously penetrate from edge faces of many heat-resistant separators 4b. Therefore, the melted material easily penetrates even heat-resistant separators 4b positioned at a central portion in the laminate direction, resulting in a higher bond strength. The other constituents are the same as those in the first and second exemplary embodiments, and therefore, the description and the illustration are omitted.

Figure 14:
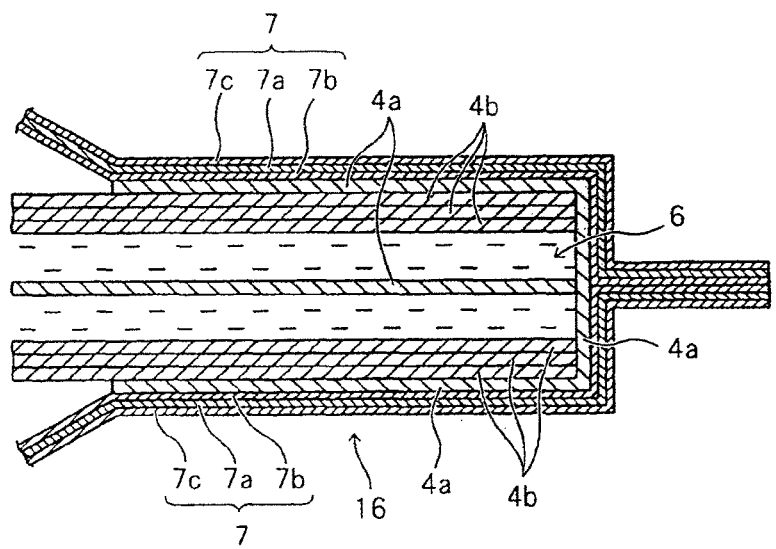
FIG. 14 is an enlarged cross-section view showing a principal part of a secondary battery in a modification of the third exemplary embodiment of the present invention.

FIG. 14 shows a modification of the exemplary embodiment. In the modification, similar to the configurations shown in FIGS. 5, 10 and 12, in addition to the outermost layers, from among many separators, one intermediate layer is adhesive separator 4a. In FIG. 14, heat-resistant separators 4b positioned at an intermediate portion are omitted, and only adhesive separator 4a is illustrated. According to the configuration, it is possible to further increase the bond strength, and it is possible to reduce the area of welding portion 16 and enhance space utilization.

Figure 15:
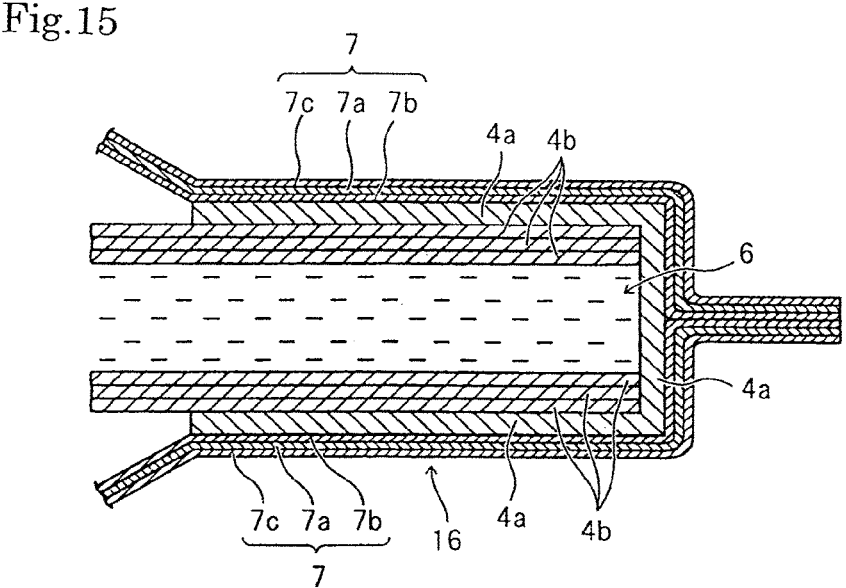
FIG. 15 is an enlarged cross-section view showing a principal part of a secondary battery in an alternative modification of the third exemplary embodiment of the present invention.

FIG. 15 shows an alternative modification of the exemplary embodiment. In the modification, the thickness of adhesive separator 4a is increased. According to the configuration, it is possible to further increase the bond strength, and it is possible to further reduce the area of welding portion 16 and enhance space utilization.

Figure 16:
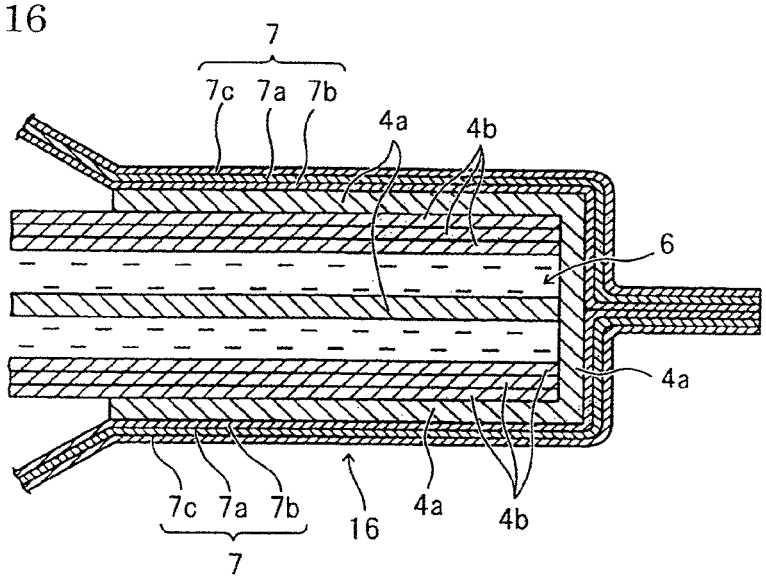
FIG. 16 is an enlarged cross-section view showing a principal part of a secondary battery in a further alternative modification of the third exemplary embodiment of the present invention.

FIG. 16 shows a further alternative modification of the exemplary embodiment. In the modification, similar to the example shown in FIG. 15, the thickness of adhesive separator 4a is increased, and furthermore, similar to the configurations shown in FIGS. 5, 10, 12 and 14, in addition to the outermost layers, one intermediate layer from among many separators is adhesive separator 4a. In FIG. 14, heat-resistant separators 4b positioned at an intermediate portion are omitted, and only adhesive separator 4a is illustrated. According to the configuration, it is possible to further increase the bond strength, and it is possible to further reduce the area of welding portion 16 and enhance space utilization.

In the above-described exemplary embodiments, an electrode laminated body in which a plurality of positive electrodes 2 and a plurality of negative electrodes 3 are laminated alternately and repeatedly with separators 4 interposed therebetween is used as electric storage element 5. However, an electrode laminated body in which only one positive electrode 2 and only one negative electrode 3 overlap with separators 4 interposed therebetween may be used as electric storage element 5. In this case as well, heat-resistant separator 4b is disposed between positive electrode 2 and negative electrode 3, and adhesive separators 4a are disposed as the outermost layers. The present invention is particularly useful for lithium ion secondary batteries, but can also be productively applied to secondary batteries other than lithium ion batteries, and electrochemical devices other than batteries, as exemplified by capacitors (condensers).

While the invention has been particularly shown and described with reference to exemplary embodiments thereof, the present invention is not limited to these embodiments. It will be understood by those of ordinary skill in the art that various changes in form and details may be made therein without departing from the spirit and scope of the present invention as defined by the claims.

What is claimed is:

1. An electrochemical device comprising:
   an electric storage element that includes a positive electrode, a negative electrode and a plurality of separators, said positive electrode and said negative electrode overlapping, each other with said separators interposed therebetween; and
   an outer container that is composed of a flexible film, the outer container containing said electric storage element, wherein
   said separators include an adhesive separator and a heat-resistant separator whose melting point is higher than the melting point of said adhesive separator, and at least a part of said adhesive separator is welded to said flexible film that comprises said outer container,
   the adhesive separator and the heat-resistant separator which extend from an electrode laminated body of the electric storage element, and the flexible film which comprises the outer container, are thermally welded to each other,
   at least one of said separators is disposed between said positive electrode and said negative electrode,
   at least one of said separators is disposed as an outermost layer of said electric storage element,
   said separator disposed as the outermost layer of said electric storage element is said adhesive separator is welded to said flexible film, and
   said separator disposed between said positive electrode and said negative electrode is said heat-resistant separator.

2. The electrochemical device according to claim 1, wherein said heat-resistant separator is composed of a resin whose melting point is 300° C. or higher.

3. The electrochemical device according to claim 1, wherein a difference in melting points between said adhesive separator and said flexible film is up to 20° C.

4. The electrochemical device according to claim 1, wherein a porosity of said heat-resistant separator is 55% or higher.

5. The electrochemical device according to claim 2, wherein a difference in melting points between said adhesive separator and said flexible film is up to 20° C.

6. The electrochemical device according to claim 2, wherein a porosity of said heat-resistant separator is 55% or higher.

7. The electrochemical device according to claim 3, wherein a porosity of said heat-resistant separator is 55% or higher.

* * * * *